(12) United States Patent
Castillo et al.

(10) Patent No.: US 10,178,303 B2
(45) Date of Patent: Jan. 8, 2019

(54) DIRECTED IMAGE CAPTURE

(71) Applicant: HOVER INC., San Francisco, CA (US)

(72) Inventors: William Castillo, Redwood City, CA (US); Derek Halliday, Oakland, CA (US); Manish Upendran, San Francisco, CA (US)

(73) Assignee: HOVER INC., San Francisco, CA (US)

( * ) Notice: Subject to any disclaimer, the term of this patent is extended or adjusted under 35 U.S.C. 154(b) by 0 days.

(21) Appl. No.: 15/475,932

(22) Filed: Mar. 31, 2017

(65) Prior Publication Data

US 2017/0208245 A1     Jul. 20, 2017

Related U.S. Application Data

(63) Continuation-in-part of application No. 15/348,038, filed on Nov. 10, 2016, which is a
(Continued)

(51) Int. Cl.
*H04N 5/232* (2006.01)
*G06T 7/00* (2017.01)
(Continued)

(52) U.S. Cl.
CPC ....... *H04N 5/23222* (2013.01); *G06T 7/0002* (2013.01); *H04N 1/2104* (2013.01);
(Continued)

(58) Field of Classification Search
None
See application file for complete search history.

(56) References Cited

U.S. PATENT DOCUMENTS

| 5,973,697 A | 10/1999 | Berry et al. |
| 7,218,318 B2 | 5/2007 | Shimazu |

(Continued)

FOREIGN PATENT DOCUMENTS

| WO | WO2007147830 A1 | 12/2007 |
| WO | WO2011079241 A1 | 6/2011 |
| WO | WO2011091552 A1 | 8/2011 |

OTHER PUBLICATIONS

Abdul Hasanulhakeem1; A tool to measure dimensions of buildings in various scales for Google Earth Plug-ins and 3D maps; Aug. 6, 2010; pp. 1-2 downloaded from internet: [https://groups.google.com/forum/#!topic/google-earth-browser-plugin/frlvZQ-m38l].

(Continued)

*Primary Examiner* — Said Broome
(74) *Attorney, Agent, or Firm* — Garlick & Markison; Randy W. Lacasse

(57) ABSTRACT

A process is provided for guiding a capture device (e.g., smartphone, tablet, drone, etc.) to capture a series of images of a building. Images are captured as the camera device moves around the building—taking a plurality of images (e.g., video) from multiple angles and distances. Quality of the image may be determined to prevent low quality images from being captured or to provide instructions on how to improve the quality of the image capture. The series of captured images are uploaded to an image processing system to generate a 3D building model that is returned to the user. The returned 3D building model may incorporate scaled measurements of building architectural elements and may include a dataset of measurements for one or more architectural elements such as siding (e.g., aluminum, vinyl, wood, brick and/or paint), windows, doors or roofing.

18 Claims, 11 Drawing Sheets

Related U.S. Application Data continuation-in-part of application No. 15/166,587, filed on May 27, 2016.

(60) Provisional application No. 62/168,460, filed on May 29, 2015, provisional application No. 62/253,441, filed on Nov. 10, 2015.

(51) Int. Cl.
| | |
|---|---|
| *H04N 1/21* | (2006.01) |
| *H04N 13/221* | (2018.01) |
| *H04N 13/00* | (2018.01) |
| *H04N 13/296* | (2018.01) |

(52) U.S. Cl.
CPC ....... *H04N 5/23293* (2013.01); *H04N 13/221* (2018.05); *G06T 2207/10004* (2013.01); *G06T 2207/10016* (2013.01); *H04N 13/296* (2018.05); *H04N 2013/0081* (2013.01)

(56) References Cited

U.S. PATENT DOCUMENTS

| | | | |
|---|---|---|---|
| 7,711,179 B2* | 5/2010 | Knighton | G01B 11/24 382/154 |
| 7,814,436 B2 | 10/2010 | Schrag et al. | |
| 8,040,343 B2 | 10/2011 | Kikuchi et al. | |
| 8,098,899 B2 | 1/2012 | Ohashi | |
| 8,139,111 B2 | 3/2012 | Oldroyd | |
| 8,284,190 B2* | 10/2012 | Muktinutalapati | G06T 7/33 345/419 |
| 8,339,394 B1 | 12/2012 | Lininger | |
| 8,350,850 B2 | 1/2013 | Steedly et al. | |
| 8,390,617 B1 | 3/2013 | Reinhardt | |
| 2003/0014224 A1 | 1/2003 | Guo et al. | |
| 2004/0196282 A1 | 10/2004 | Oh | |
| 2007/0168153 A1 | 7/2007 | Minor et al. | |
| 2008/0221843 A1 | 9/2008 | Shenkar et al. | |
| 2010/0045869 A1 | 2/2010 | Baseley et al. | |
| 2010/0074532 A1 | 3/2010 | Gordon et al. | |
| 2011/0029897 A1 | 2/2011 | Russell | |
| 2011/0181589 A1 | 7/2011 | Quan et al. | |
| 2012/0008865 A1* | 1/2012 | Wu | G06K 9/3258 382/182 |
| 2016/0350969 A1 | 12/2016 | Castillo et al. | |

OTHER PUBLICATIONS

Bansal, et al., "Geo-Localization of Street Views with Aerial Image Databases," Nov. 28-Dec. 1, 2011, pp. 1125-1128.

Becker, et al., "Semiautomatic 3-D model extraction from uncalibrated 2-D camera views," MIT Media Laboratory, 15 pages.

Caramba App Development, "EasyMeasure—Measure with your Camera! on the App Store on iTunes", https://itunes.apple.com/us/app/easymeasure-measure-measure-your-camera!/id349530105?mt=8, 2 pages.

Chen, et al., "City-Scale Landmark Identification on Mobile Devices," pp. 737-744.

Fairfax County Virginia, "Virtual Fairfax," http://www.fairfaxcounty.gov/gis/virtualfairfax, Feb. 24, 2014, 2 pages.

Fruh and Zakhor, "Constructing 3D City Models by Merging Aerial and Ground Views," IEEE Computer Graphics and Applications, Nov./Dec. 2003, pp. 52-61, 10 pages.

Huang and Wu, et al., "Towards 3D City Modeling through Combining Ground Level Panoramic and Orthogonal Aerial Imagery," 2011 Workshop on Digital Media and Digital Content Management, pp. 66-71, 6 pages.

Jaynes, "View Alignment of Aerial and Terrestrial Imagery in Urban Environments," Springer-Verlag Berlin Heidelberg 1999, pp. 3-19, 17 pages.

Kroepfl, et al., "Efficiently Locating Photographs in Many Panoramas," Nov. 2-5, 2010, ACM GIS'10.

Lee, et al., "Automatic Integration of Facade Textures into 3D Building Models with a Projective Geometry Based Line Clustering," Eurographics 2002, vol. 2, No. 3, 10 pages.

Lee, et al., "Integrating Ground and Aerial Views for Urban Site Modeling," 2002, 6 pages.

Pu et al., "Automatic Extraction of Building Features From Terrestrial Laser Scanning," International Institute for Geo-information Science and Earth Observation, 5 pages.

Scale & Area Measurement; http://www.geog.ucsb.edu/~jeff/115a/lectures/scale_and_area_measurement.html, 8 pages.

Scope Technologies; Solutions; Mar. 4, 2014; pp. 1-2 downloaded from the internet: [http://www.myscopetech.com/solutions.php].

SketchUp Knowledge Base, Tape Measure Tool: Scaling an entire model, http://help.sketchup.com/en/article/95006, 2013 Trimble Navigation Limited, 2 pages.

Wang, et al.; Large-Scale Urban Modeling by Combining Ground Level Panoramic and Aerial Imagery; IEEE Third International Symposium on 3D Data Processing, Visualization, and Transmission; Jun. 14-16, 2006; pp. 806-813.

Xiao, et al., "Image-based Facade Modeling," ACM Transaction on Graphics (TOG), 2008, 10 pages.

* cited by examiner

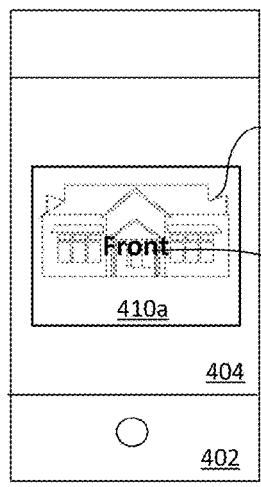 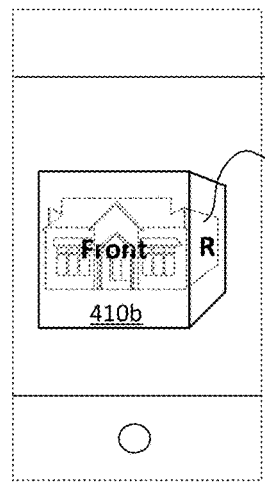 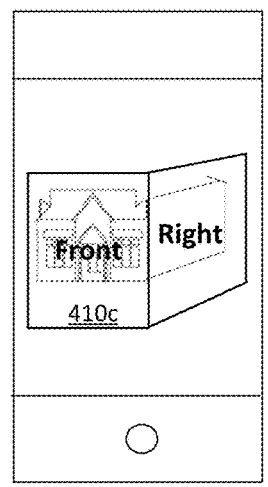
FIG. 4A  FIG. 4B  FIG. 4C
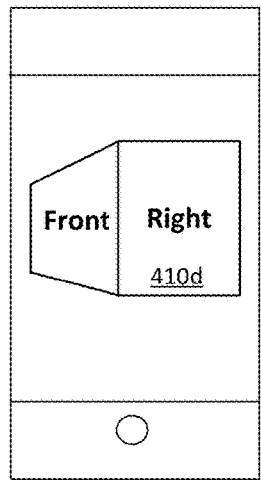 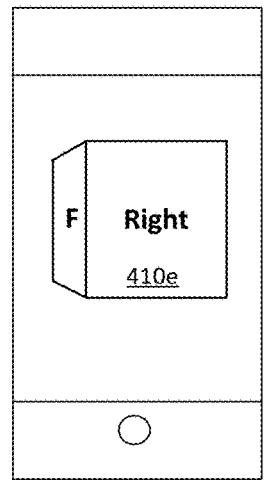 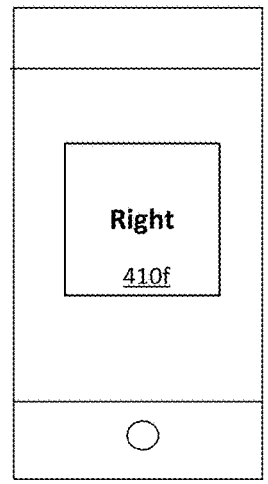
FIG. 4D  FIG. 4E  FIG. 4F Obstructions Lighting Off Center-Low Off Center-Left

DIRECTED IMAGE CAPTURE

CROSS REFERENCE TO RELATED PATENTS

The present U.S. Utility Patent Application claims priority pursuant to 35 U.S.C. § 120 as a continuation-in-part of U.S. Utility application Ser. No. 15/348,038, entitled "DIRECTED IMAGE CAPTURE," filed Nov. 10, 2016, which is a continuation-in-part of U.S. Utility application Ser. No. 15/166,587, entitled "GRAPHICAL OVERLAY GUIDE FOR INTERFACE," filed May 27, 2016, which claims priority pursuant to 35 U.S.C. § 119(e) to U.S. Provisional Application No. 62/168,460, entitled "GRAPHICAL OVERLAY GUIDE FOR INTERFACE," filed May 29, 2015, all of which are hereby incorporated herein by reference in their entirety and made part of the present U.S. Utility Patent Application for all purposes.

U.S. Utility application Ser. No. 15/348,038 claims priority pursuant to 35 U.S.C. § 119(e) to U.S. Provisional Application No. 62/253,441, entitled "IMAGE FRAME CLASSIFIER," filed Nov. 10, 2015, which is hereby incorporated herein by reference in its entirety and made part of the present U.S. Utility Patent Application for all purposes.

BACKGROUND

Technical Field

The technology described herein relates generally to directed image capture systems used in conjunction with multi-dimensional modeling systems.

Description of Related Art

Some efforts have been made to generate accurate 3D models of buildings via aerial imagery or specialized camera-equipped vehicles. However, these 3D maps have limited texture resolution, geometry quality, accurate geo-referencing and are expensive, time consuming and difficult to update and provide no robust real-time image data analytics for various consumer and commercial use cases.

BRIEF DESCRIPTION OF THE DRAWINGS

FIGS. 4A-4F collectively illustrate an embodiment of a set of guide overlays in accordance with the present disclosure;

DETAILED DESCRIPTION

Figure 1:
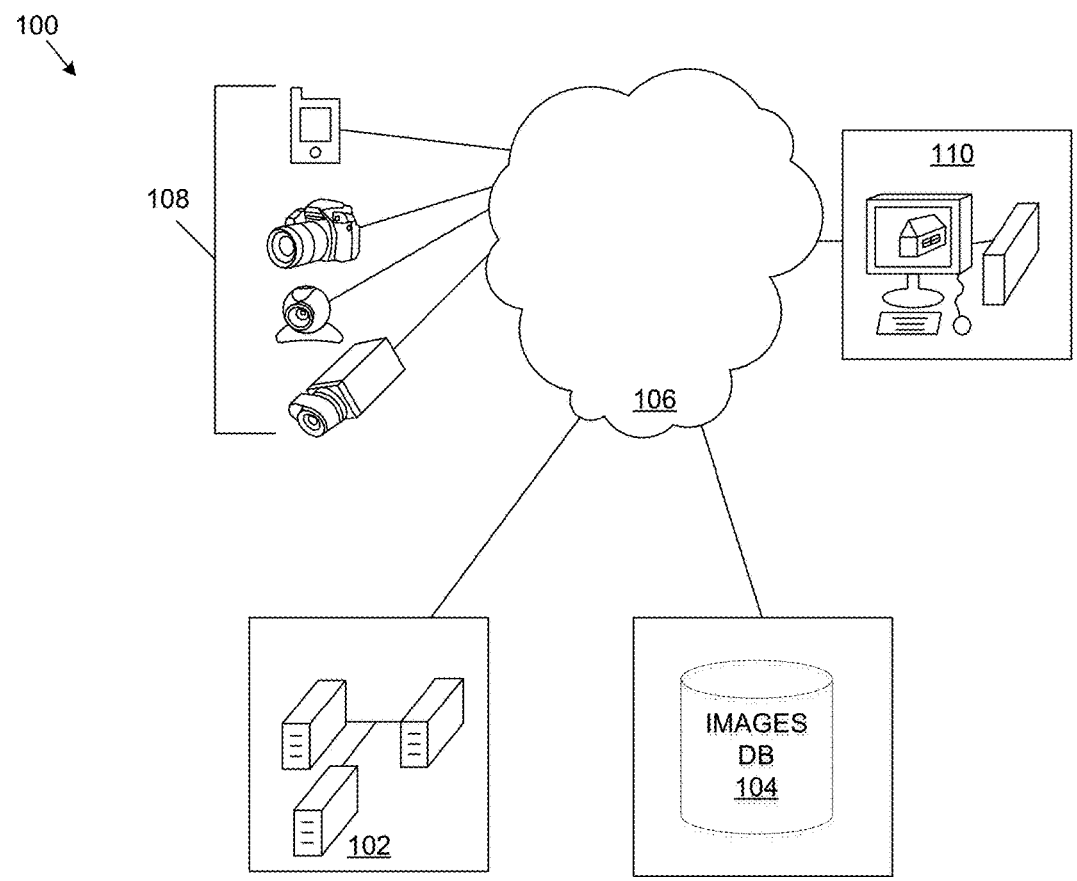
FIG. 1 illustrates one embodiment of a system architecture in accordance with the present disclosure.

FIG. 1 illustrates one embodiment of system architecture in accordance with the present disclosure. In one embodiment, image processing system 100 includes image processing servers 102. Image database (DB) 104 and image processing servers 102 are coupled via a network channel 106.

Network channel 106 is a system for communication. Network channel 106 includes, for example, an Ethernet or other wire-based network or a wireless NIC (WNIC) or wireless adapter for communicating with a wireless network, such as a WI-FI network. In other embodiments, network channel 106 includes any suitable network for any suitable communication interface. As an example, and not by way of limitation, the network channel 106 can include an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, network channel 106 can be a wireless PAN (WPAN) (such as, for example, a BLUETOOTH WPAN), a WI-FI network, a WI-MAX network, a 3G or 4G network, LTE, a cellular telephone network (such as, for example, a Global System for Mobile Communications (GSM) network), etc.

In one embodiment, network channel 106 uses standard communications technologies and/or protocols. Thus, network channel 106 can include links using technologies such as Ethernet, 802.11, worldwide interoperability for microwave access (WiMAX), 3G, 4G, LTE, CDMA, digital subscriber line (DSL), etc. Similarly, the networking protocols used on network channel 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). In one embodiment, the data exchanged over network channel 106 is represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

In one or more embodiments, image processing servers 102 include suitable hardware/software in the form of circuitry, logic gates, and/or code functions to process ground-level images to include, but not limited to, multi-dimensional model creation, calculation of one or more image measurements and extraction of building materials, features or other derivative data. Capture device(s) 108 is in communication with image processing servers 102 for collecting ground-level images of building objects. Capture devices 108 are defined as electronic devices for capturing images. For example, the capture devices include, but are not limited to: a camera, a phone, a smartphone, a tablet, a video camera, a security camera, a closed-circuit television camera, a computer, a laptop, a webcam, wearable camera devices, photosensitive sensors, IR sensors, lasers, a remote-controlled camera, drone, equivalents or any combination thereof.

Image processing system 100 also provides for viewer device 110 that is defined as a display device. For example, viewer device 110 can be a computer with a monitor, a laptop, smartphone, tablet, a touch screen display, a LED array, a television set, a projector display, a wearable heads-up display of some sort, or any combination thereof. In one or more embodiments, the viewer device includes display of one or more building facades and associated measurements, such as, for example, smartphone, tablet, or a conventional desktop personal computer having input devices such as a mouse, keyboard, joystick, or other such input devices enabling the input of data and interaction with the displayed images and associated measurements.

In one embodiment, an image processing system is provided for uploading to image processing servers 102 ground-level images of a physical building from a capture device 108. An uploaded image is, for example, a digital photograph of a physical building, for example, showing a corner with one or more sides of the physical building.

Figure 2:
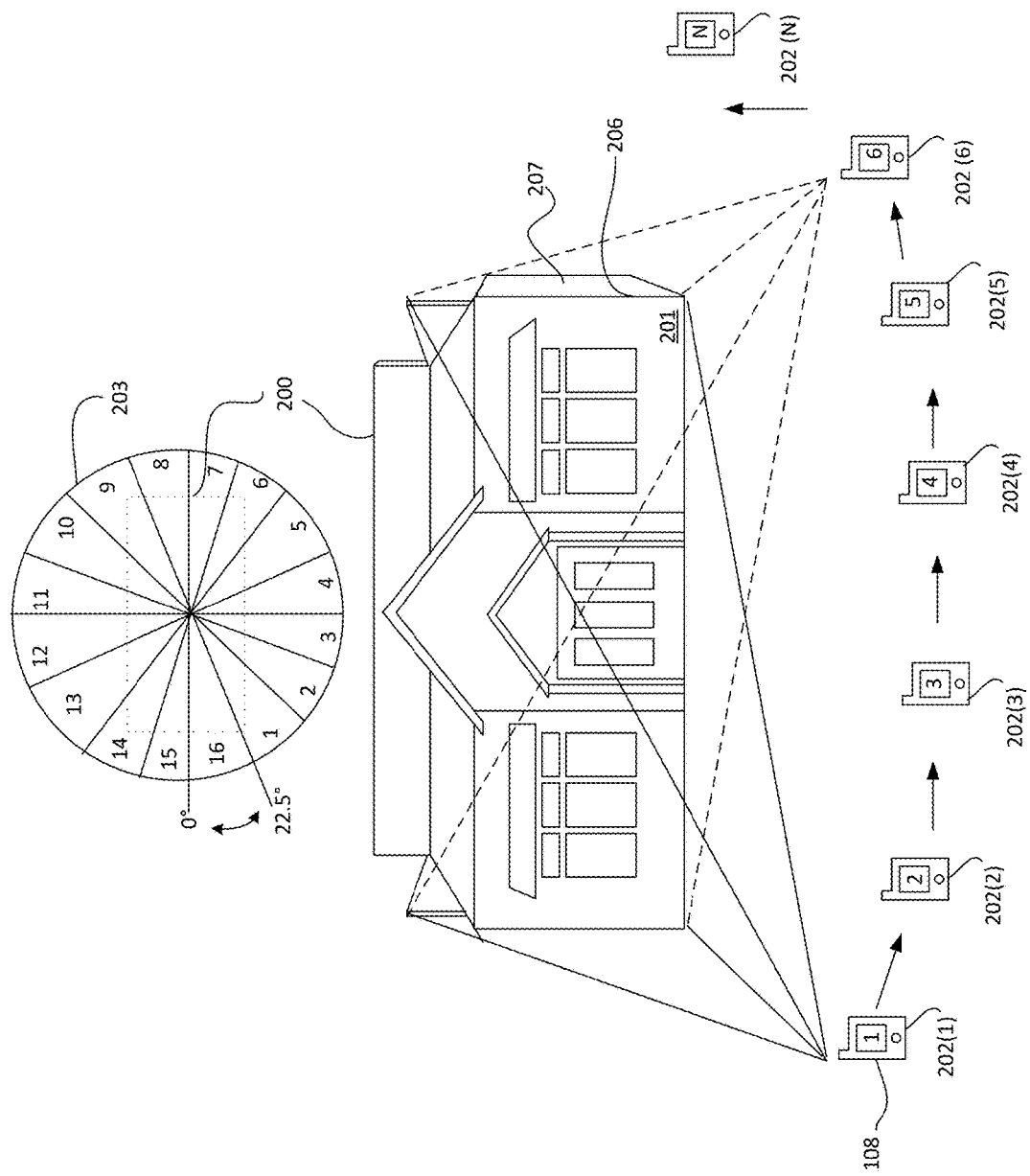
FIG. 2 illustrates an embodiment representing a process for capturing images used to create a multi-dimensional building model in accordance with the present disclosure.

FIG. 2 illustrates an example of collecting images for building 200 in accordance with the present disclosure. Images 1-N displayed (e.g., in digital view finder), generated by capture device 108, provide for different perspectives of a building (in the illustrated example—centered on the façade). For example, ground-level images can be taken to capture a building from multiple perspectives by physically moving the camera source 108 (e.g., smartphone, tablet, drone, etc.), for example, left-to-right (counter-clockwise) starting with, for example, the façade 201 of the building (but not limited thereto). As shown, images are captured as the picture taker moves around the building—taking a plurality (e.g., 4-16 for an entire building) of images from multiple angles and distances. The series of captured images will be uploaded to image processing servers 102 to be processed to generate a multi-dimensional (e.g., 3D) building model and returned to the user for storage/display.

As shown, image 202(1) provides for a left most building façade perspective relative to other images. Image 202(6) provides for a right most building façade perspective relative to the other images. Images 202(2) through 202(5) represent the building façade from four additional perspectives between images 202(1) and 202(6). While shown as 6 images of the front façade 201 of the building, the user continues around the building taking photos as suggested by guide overlays (discussed in greater detail in association with FIGS. 4A-4F) until the building is captured (e.g., shown as 16 sectors 203). The number of image captures may vary with each building capture without departing from the scope of the technology described herein. However, in one embodiment, captures including at least one corner (e.g. 206) as well as two sides (e.g., façade 201 and right side 207) provide quality building image captures. In addition, while described for ground-level imagery, near-ground imagery (e.g., from drone with a camera) may be substituted without departing from the scope of the descriptions provided in any of the embodiments described herein.

Figure 3:
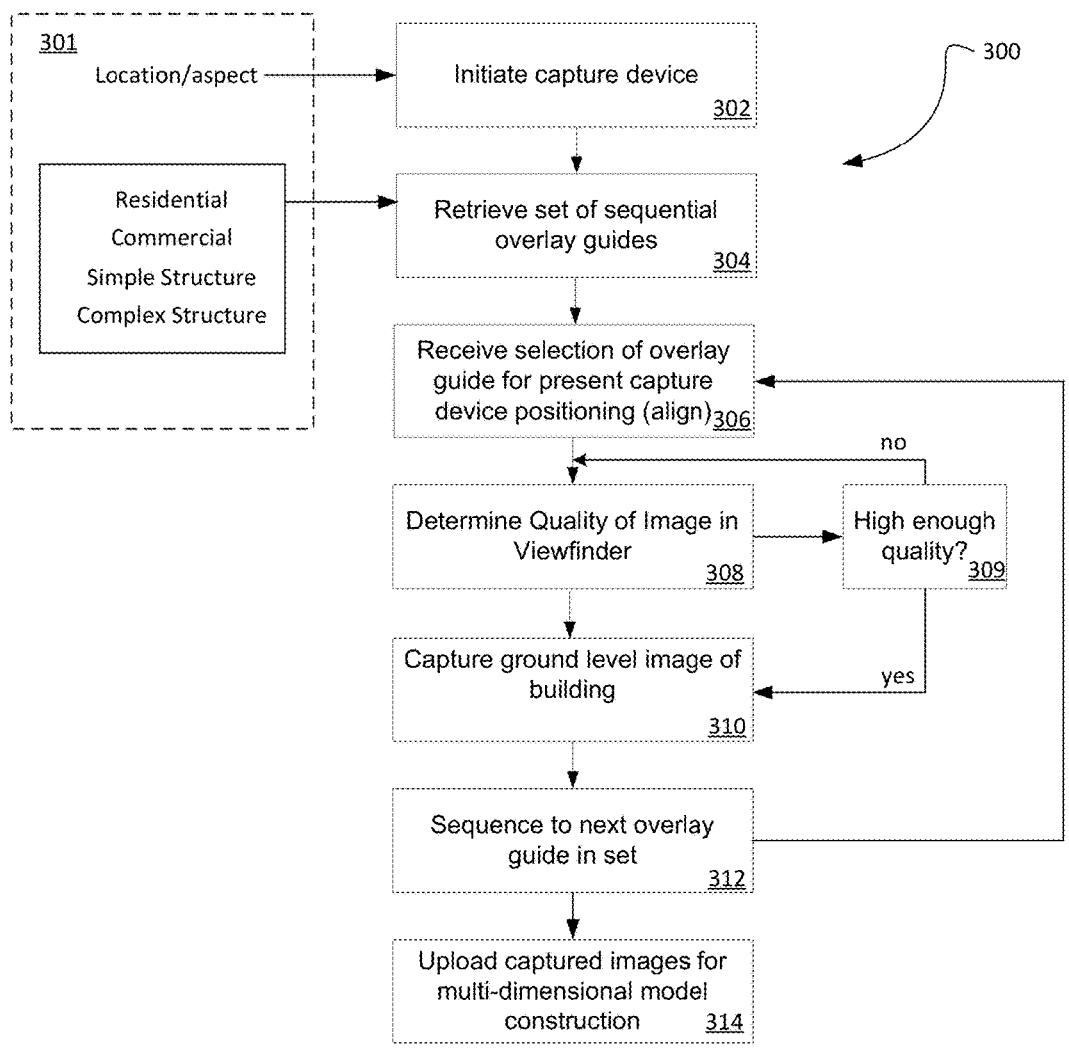
FIG. 3 illustrates a flow diagram representing a process for accurately guiding a user to capture images used to create a 3D building model in accordance with the present disclosure.

FIG. 3 illustrates a flowchart representing the process for accurately guiding a user to capture images used to create a 3D building model in accordance with the present disclosure. Process 300 begins in step 302 with initiation of a capture device 108 (e.g., smartphone with camera). Initiation may include one or more of: determining location and/or aspect (i.e., perspective), determining user information (name, login, account info, etc.), and/or determining if the subject of the ground level image is a residential or commercial building (manually from user selection or automatically from address, location determination and/or perspective). For example, the user's location can be determined from an address, known coordinates (latitude/longitude) or GPS. Alternately, using sensors of the capture device (e.g., pitch, yaw and roll axis), a determination can be made as to which surrounding building is the subject of the capture (i.e., facing a specific building on the south side of the street at a specific location). Other known equivalent methods can be substituted without departing from the scope of the technology disclosed herein. In one embodiment, the location step is skipped and the 3D building model results returned to the user without consideration of location.

In step 304, a first overlay from a set of sequential graphical overlay guides is retrieved for display on capture device 108. For example, a first overlay guide illustrating a 3D perspective graphic can be a front/right guide as shown in FIG. 4B. The front/right overlaid guide includes a 3D perspective front image pane, right corner edge and partial right side pane of a building and, in one embodiment, is displayed as a semi-transparent graphic (i.e., can see through for general alignment purposes). Other graphical overlays may be used without departing from the scope of the present disclosure. The graphical overlay guides are not used to assist in focusing the camera. In step 306, the system receives a selection of which overlay guide best matches the present perspective of the capture device (manually from the user or automatically based on an analysis of the orientation of the building in the image, location and/or perspective). Selections, such as simple or complex structure, assist in generating an appropriate set of specific overlay guides. For example, if the user is right of center facing a simple structure building, an example front/right overlay guide (i.e., a 3D representation of the right/front corner of a simple building) would be best. While the system may automatically determine perspective based on visual cues in the camera image (still or video sequence), if the user is not aligned with the appropriate guide of the building, they can sequence through the set of overlay guides until arriving at the appropriate overlay guide for their position/perspective.

In step 306, using received overlay guides as an alignment tool, the capture device camera image is substantially aligned (perfect alignment not required) with the overlay guide. In step 308, a determination is made of relative picture quality (discussed in detail in association with FIGS. 5-11). The process for determining picture quality can, in one embodiment, be continuously repeated in near real-time (e.g., 5-10 frames per second (FPS) or faster). Picture quality can include an analysis of many variables such as, but not limited to, usability for multi-dimensional building (e.g., a front corner image showing two facades coming together), percentage of building façade pixels within a frame of the viewfinder, distance of building façade pixels from centroid of picture (is building centered), number of times a sky within the image touches the ground (touching on both sides of building may suggest centered image), number of sky pixels touching top of building, lighting factors, such as brightness, dimness, glare, shading, as well as percentage of a building pixels obscured by other objects (bushes, trees, vehicles, people, etc.).

These quality components can, in one embodiment, be determined from a machine learning algorithm (e.g., various image features are extracted with a rating given to a specific feature and compared overtime to learn which features and their associated quality are effective in determining a quality image). This process includes continuously improving the quality determination with analysis of a greater number of data features and/or data sets.

Once a quality threshold (minimum quality level as set by processing system 102, machine learning algorithm, training set, or user of system) is determined (high enough quality 309), the image is taken (captured) and the process recognizes (associates) that a captured image (photo) of the building from the selected overlay guide is taken. If not of a high enough quality (e.g., low usability to construct potential multi-dimensional building models), the process returns to determining the quality and, in one embodiment, may suggest corrective steps to the user capturing the image (e.g., move to a better angle, better position, move the camera, better lighting needed, etc.). In step, 310, the picture is captured, either manually by the user or automatically taken when substantially aligned with the overlay guide and receiving an indication of acceptable quality. The image capture is, for example, for one or more architectural features, or one or more angles of the capture device relative to the building, or one or more distances of the capture device relative to the building The indication of acceptable quality can, in various embodiments, be a visual indicator (e.g., red color graphic, green color graphic, flashing image, etc.), audible indicator, or a combination thereof. In one embodiment, the image is stored locally in memory where it will be uploaded to be received by images data base 104 for multi-dimensional model construction by processing system 102. In one embodiment, the images are sent immediately upon being captured. In another embodiment, the images are collected together, as detailed below, until the process of capturing the building is completed and then the images are uploaded.

In step 312, the overlay guide is sequentially advanced (e.g., moving counter-clockwise around the building) guiding the user to a next position to take another image of the building. The process continues until the building is captured (e.g., four corners). While, only one corner image of the building is required to minimally capture the building, the quality and accuracy of a 3D model of the building created from the images will improve with a greater number and better circumferential distribution (e.g., all sides and corners).

In step 314, the captured images are uploaded to image processing servers 102 to generate a 3D model. The technology described herein is not limited by the method to produce the 3D building model. In one example embodiment, the images are uploaded to images DB 104 or to another computer/server memory for storage before processing in 102. In one example embodiment, the images are uploaded from third party image services (e.g., Flickr, Facebook, Twitter, etc.) first before being uploaded to image processing servers 102/images DB 104. For another example, the images are transferred first from a camera to a networked computer (e.g., cloud based server system), and then to image processing servers 102/images DB 104. The series of captured images are uploaded to an image processing system to generate a 3D building model that is returned to the user. The returned 3D building model may incorporate scaled measurements of building architectural elements and may include a dataset of measurements for one or more architectural elements such as siding (e.g., aluminum, vinyl, wood, brick and/or paint), windows, doors or roofing. Also, the 3D building model may be created and/or displayed (partially or wholly) in real-time as the ground images are being captured.

In addition, while described for guide overlays, on-screen positioning directions, audio prompts, or a combination thereof, (e.g., how to position a camera) may be substituted without departing from the scope of the descriptions provided in any of the embodiments described herein.

FIGS. 4A-4F collectively illustrates a set of guide overlays in accordance with the present disclosure. For brevity purposes, the illustrations are limited to six overlays. However, a more complete set would include a plurality overlay guides to capture the entire building including all sides/corners with various perspectives of the building. For example, a plurality of ground-level images is collected for each visible side and/or corner of the building using the overlay guides. In an alternate example embodiment, when a building is part of a larger collection of buildings (i.e., a townhome, a store in a strip mall, etc.) not all sides of the building are accessible for ground-level images as at least one side is shared with an adjacent building and therefore many of the guides are skipped from the sequential set of graphical guides.

As shown, smartphone 402 includes a display section 404. When a camera of the smartphone is activated for taking a photo, the digital viewfinder shows the subject of the picture (in this case a building of interest 406) in display 404. Overlay guides 410a-410f are sequential counter-clockwise perspectives of the building. The user simply positions himself/herself such that the building's orientation in the viewfinder substantially matches the orientation of the overlay guide and takes the picture. To improve an image capture, the user should try to capture as much of the building in the viewfinder as possible (e.g., centered top-to-bottom and left-to-right). As illustrated, the sides are named "Front, Right, Left, Back" 408 or "F, R, L or B" 406 when perspective space does not allow for the complete wording. Sequencing though the overlay guides prompts a user to sequentially move around the building using, for example, their smartphone in a structured manner to better capture a plurality of images capturing the entire building.

Figure 5:
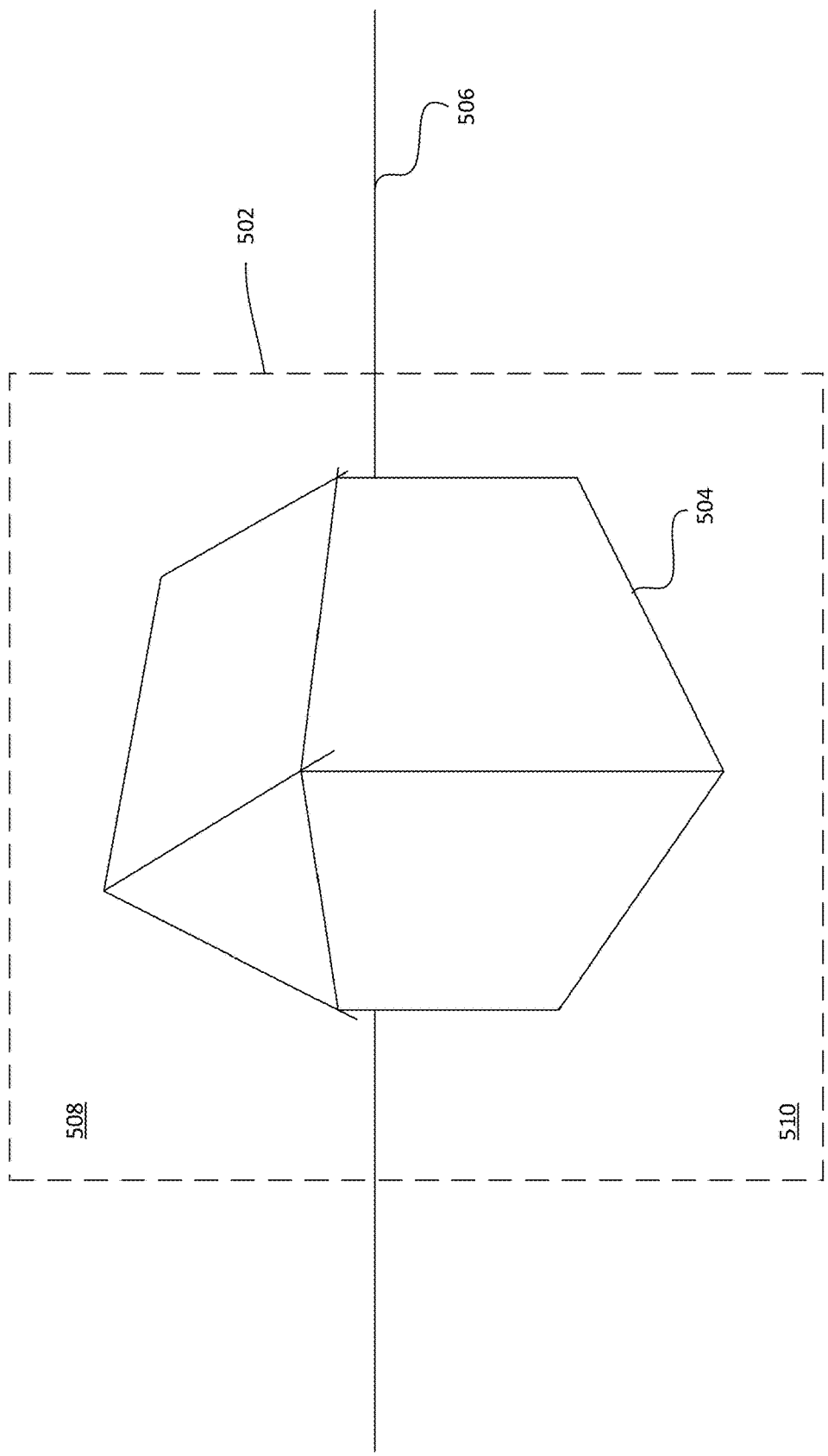
FIG. 5 illustrates an example embodiment of a digital view finder with a centered ground-level image of a building in accordance with the present disclosure.

FIG. 5 illustrates an example of a digital view finder with a centered ground-level image of a building in accordance with the present disclosure. In previously discussed step 308, a determination is made of relative picture quality. FIG. 5 illustrates an image within view finder 502 in the upper spectrum of quality (i.e., highest quality). The image includes a centered (left-to-right and top-to-bottom) building 504 with at least one corner and two facades captured. No lighting problems are detected, no obstructions obscure the building, the roof touches the sky 508 along its total length and the sky touches the ground 510 in at least two places (on each side of the building). While this represents an ideal, high quality image, it may not represent the typical image being captured during a typical building capture. Various items reduce the quality of images, such as, human error (moving the capture device during capture (creating blurred images), not properly centering the building within the view finder frame, etc.), not ensuring the building orientation is substantially matching the orientation of the guide overlay, obstructions, spacing (standing too close, too far away, limited area to take pictures, etc.), lighting (sun glare or shading effects), faults with the capture device (problems with: lens (e.g., dirty), hardware, software, power, memory (e.g., full), etc.). Each problem reduces the potential quality of an image capture. In one embodiment, thresholds of quality are established to classify view finder images which will be used/not used in the capture process. On example "highest" quality has been described above. The next threshold level "high" quality could include a centered image with at least one corner of the building in the image. The next threshold level "good" quality could include a centered image with at least defined building edges within the image. The next threshold level "useable" quality could include a mostly centered image with at least one façade (side) in the image and the last threshold "bad/useless" quality could include off centered, with lighting problems (e.g., too dark/bright) and many obstructions.

Figure 6B:
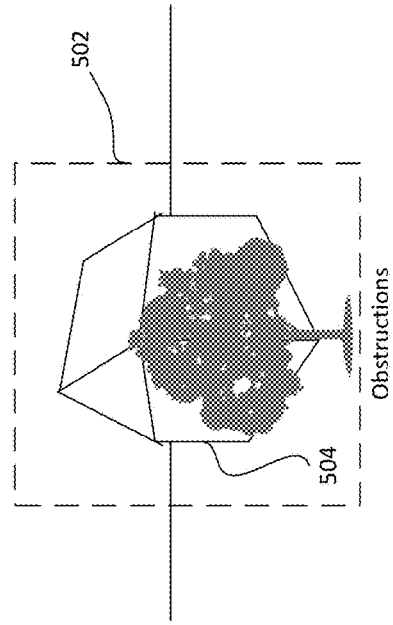
FIGS. 6A-6D each illustrate example embodiments of a digital view finder with an image of a building in accordance with the present disclosure.
Figure 6A:
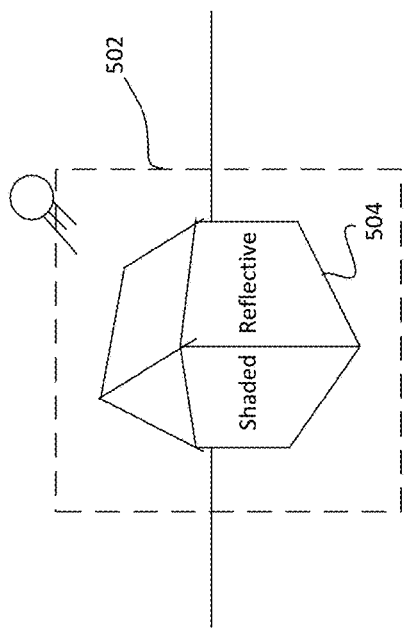

FIGS. 6A-6D illustrates examples of a digital view finder with an image of a building in accordance with the present disclosure. As shown, FIGS. 6A-6F show various example issues which potentially may lower quality of an image capture. FIG. 6A illustrates building 504 with two potential lighting problems, a highly reflective or light saturated side of an image. As is known, an image with over-lighting from sun or man-made sources can obscure the image and therefore make it less useable for building accurate 3D building models. Also, as shown, a heavily shaded side can create similar problems. While lighting is one element in determining a high-quality image, it is a relatively low level issue as techniques are known with the art of photography to manually/automatically adjust lighting factors either by the camera or at post processing (i.e., photo editing).

FIG. 6B illustrates building 504 with potential obscuration problems. A frequently encountered item obscuring buildings is vegetation such as shrubs or trees. An image with significantly obscured facades (sides) or corners make an image capture less useable for building accurate 3D building models. In addition, vehicles parked in front, people located within the view finder frame, other buildings, etc. can have a negative effect on quality. However, like lighting, obscuration can be a relatively low level issue as techniques are known with the art of photography to automatically remove items obscuring buildings by image processing techniques. Such techniques, include, but are not limited to, editing software to remove obstructions such as replacing obscured façade pixels with non-obscured façade pixels within a façade boundary. Stitching together images taken at other angles which show façade surfaces unobstructed (e.g., from a side angle), or utilizing untextured or synthetic textured modeling techniques.

Figure 6D:
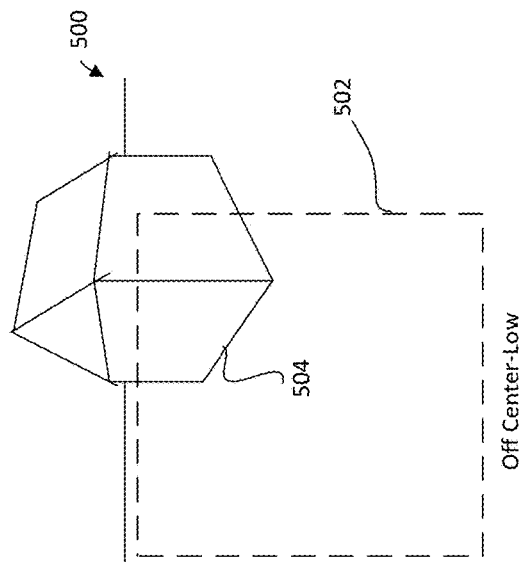
Figure 6C:
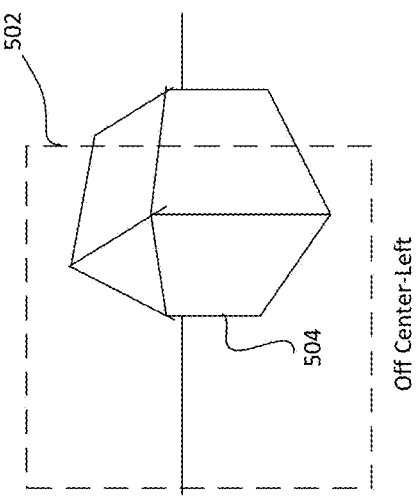

FIG. 6C and FIG. 6D illustrate building 504 with potential image off-centering problems. A frequently encountered problem when capturing images of buildings (especially large buildings) is when spacing does not allow a user to position themselves to capture the entire building within the viewfinder or failure to properly center the image. FIG. 6C illustrates an off-center left potential building image capture. FIG. 6D illustrates an off-center low potential building image capture. While two specific instances are shown, any off-center image where a centroid of the building is located a distance away from a center point of the viewfinder is considered off-center. However, unlike lighting, off-centered images can be a relatively higher level issue as entire sections of the building may be missing. However, techniques to overcome off-centered errors, include, but are not limited to, stitching together images taken at other angles which show façade surfaces missing from a specific off-centered image.

Figure 7A:
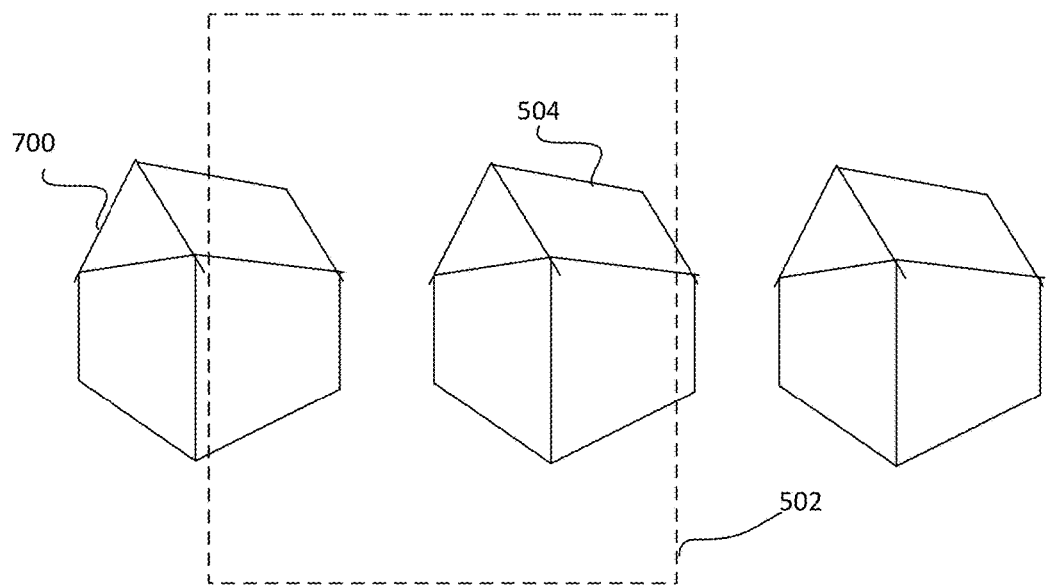
FIGS. 7A-7B illustrates an example embodiment illustrating a building with potential image capture quality problems in accordance with the present disclosure.

FIG. 7A illustrates building 504 with potential image capture quality problems. Another frequently encountered problem when capturing images of buildings occurs when a subject building is in close proximity to other buildings and appears within the viewfinder and a subsequent image capture. FIG. 7A illustrates an off-center left potential building image capture. Also, included within the viewfinder is building 700 which is not attached to the subject building and may add a high façade pixel percentage from the unrelated building to an overall façade pixel percentage. Techniques to overcome these off-centered errors which include other structures, include, but are not limited to, using image processing techniques to identify unrelated structures and removing or ignoring these façade pixels when creating the multi-dimensional building model.

Figure 7B:
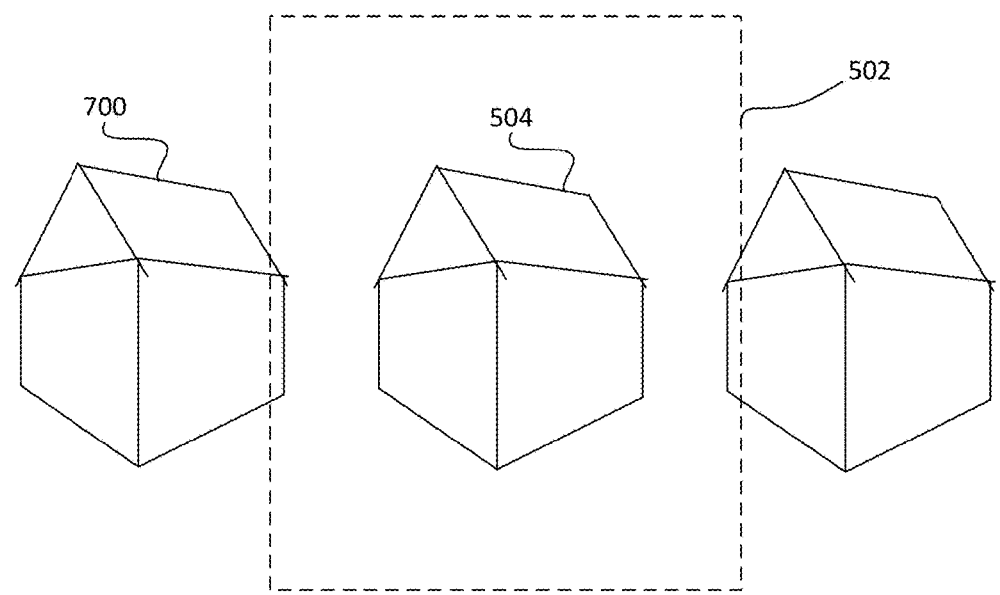

FIG. 7B illustrates the same building configuration with the subject building properly centered within the viewfinder to increase a quality of a potential image capture. In this case, surrounding buildings do not significantly contribute to erroneous façade pixels.

Figure 8:
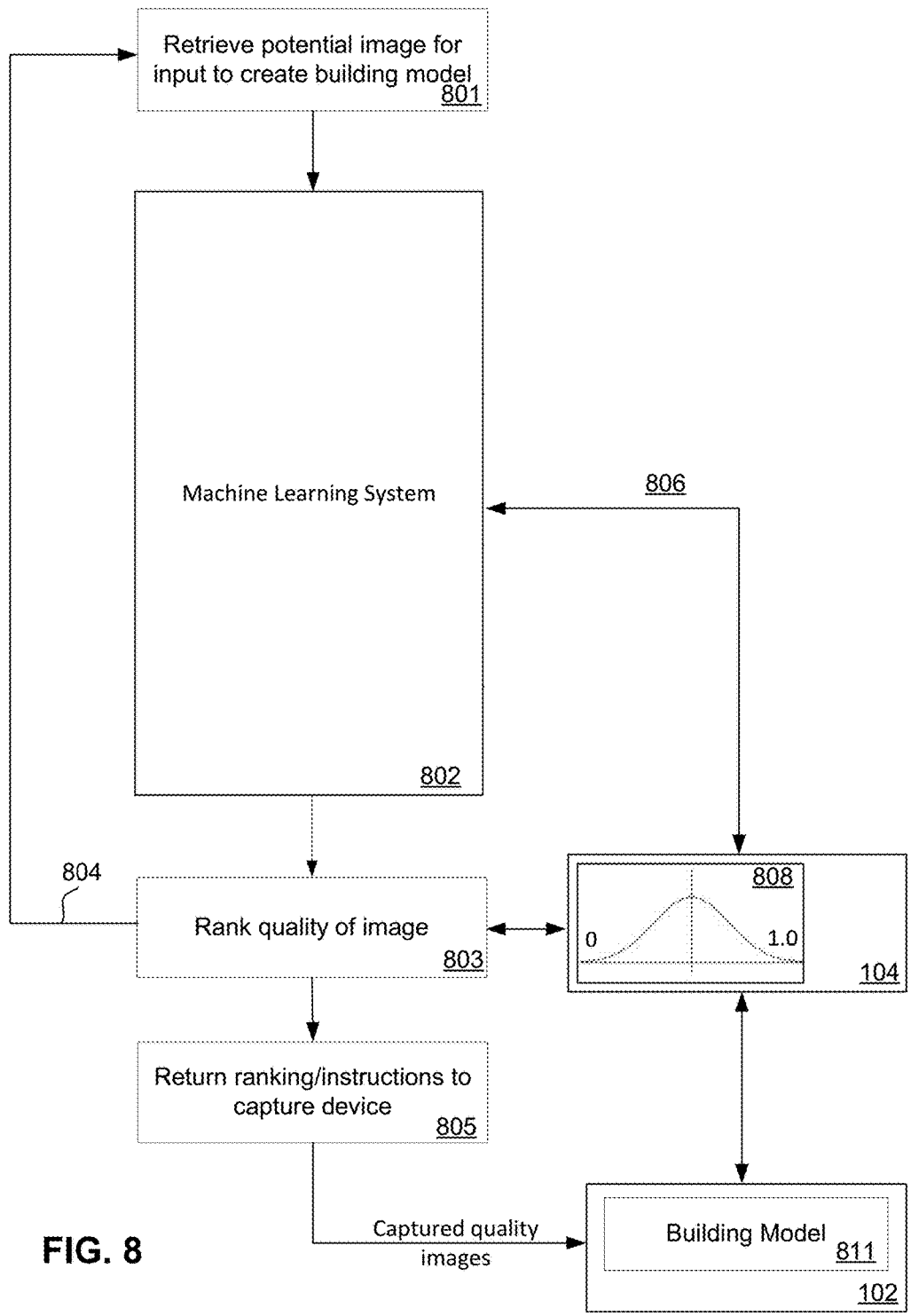
FIG. 8 illustrates a flow diagram of an alternate embodiment for monitoring quality of ground-level building image capture in accordance with the present disclosure.

FIG. 8 illustrates a flow diagram of an alternate embodiment for monitoring quality of ground-level building image capture in accordance with the present disclosure. In step 801, a potential building model image, for example, as displayed on a capture device viewfinder, is retrieved for analysis. The analysis may take place locally on image capture device 108 (e.g., as part of an app), be partially processed remotely by, for example, a remotely located image processing system 102, or be processed completely by remote image processing (e.g., image processing system 102).

Initially, to build image quality classifier 808, one or more training sessions are run for a series of sample images (e.g., 10,000). Once built (i.e., aggregation of multiple image analysis results), image quality classifier 808 assesses each new image based on previously defined quality levels. In this embodiment, machine learning system 802 calculates a rating of the image without, for example, using labeled data (e.g., façade pixels, centering, obfuscation, lighting, etc.). Machine learning system techniques, such as neural or deep learning techniques, incorporate algorithms to detect patterns and features without hard defined metrics. Deep learning (deep machine learning, or deep structured learning, or hierarchical learning, or sometimes DL) is a branch of machine learning based on a set of algorithms that attempt to model high-level abstractions in data by using multiple processing layers with complex structures or otherwise, composed of multiple non-linear transformations. For deep learning, rather than extracting manually designed features from data, deep learning methods translate data into compact intermediate representations akin to principal components, and derive layered structures which remove redundancy in representation. Deep learning algorithms are based on distributed representations. The underlying assumption behind distributed representations is that observed data is generated by the interactions of many different factors on different levels. These different levels correspond to different levels of abstraction or composition. Varying numbers of layers and layer sizes can be used to provide different amounts of abstraction. Deep learning exploits this idea of hierarchical explanatory factors where higher level, more abstract concepts being learned from the lower level ones. Deep learning thus helps to disentangle these abstractions and pick out which features are useful for learning.

An observation (e.g., an image) can be represented in many ways such as a vector of intensity values per pixel, or in a more abstract way as a set of edges, regions of particular shape, etc. Some representations make it easier to learn tasks (e.g., face recognition or facial expression recognition) from examples. Various deep learning architectures such as deep neural networks, convolutional deep neural networks, deep belief networks and recurrent neural networks can be applied to the image analysis of the various embodiments described herein without departing from the scope of the technology described herein.

Machine learning system 802 is shown for illustrative purposes as being separate from image quality classifier 808, however, it can be part of the same system (i.e., machine learning system part of the classifier), part of a distributed system, cloud based environment, and/or shared processing environment.

In step, 803, a comparison of a machine learning analysis of the input potential image to aggregated machine learning system ratings (within classifier 808) produces an overall ranking of quality. A quality ranking can be, for example, on a scale of 0-1.0, with 0 being unusable and 1.0 being perfect. An image would need to meet a threshold of quality (e.g., 0.25) to be useable. In step 805, an indication of quality (e.g., a graphic, sound or color indicator) is fed back to the capture device to instruct the user that they can take the image or need to modify some aspect (e.g., move left, right, capture device up/down) to produce an acceptable image. For low quality ranked images, also in step 805, commands may be fed back to the capture device display or by audio features of the capture device to modify the low-quality aspect of the image in the viewfinder (e.g., by moving capture device relative to building object).

The process is repeated 804 for each potential building model image, with completed images sent/pulled to the image processing system 102 for building multi-dimensional building models 811. The subset of images ultimately selected for the multi-dimensional building model build can, in one embodiment, be fed back to the image quality classifier 808 for continued improvement to learning algorithm.

Figure 9:
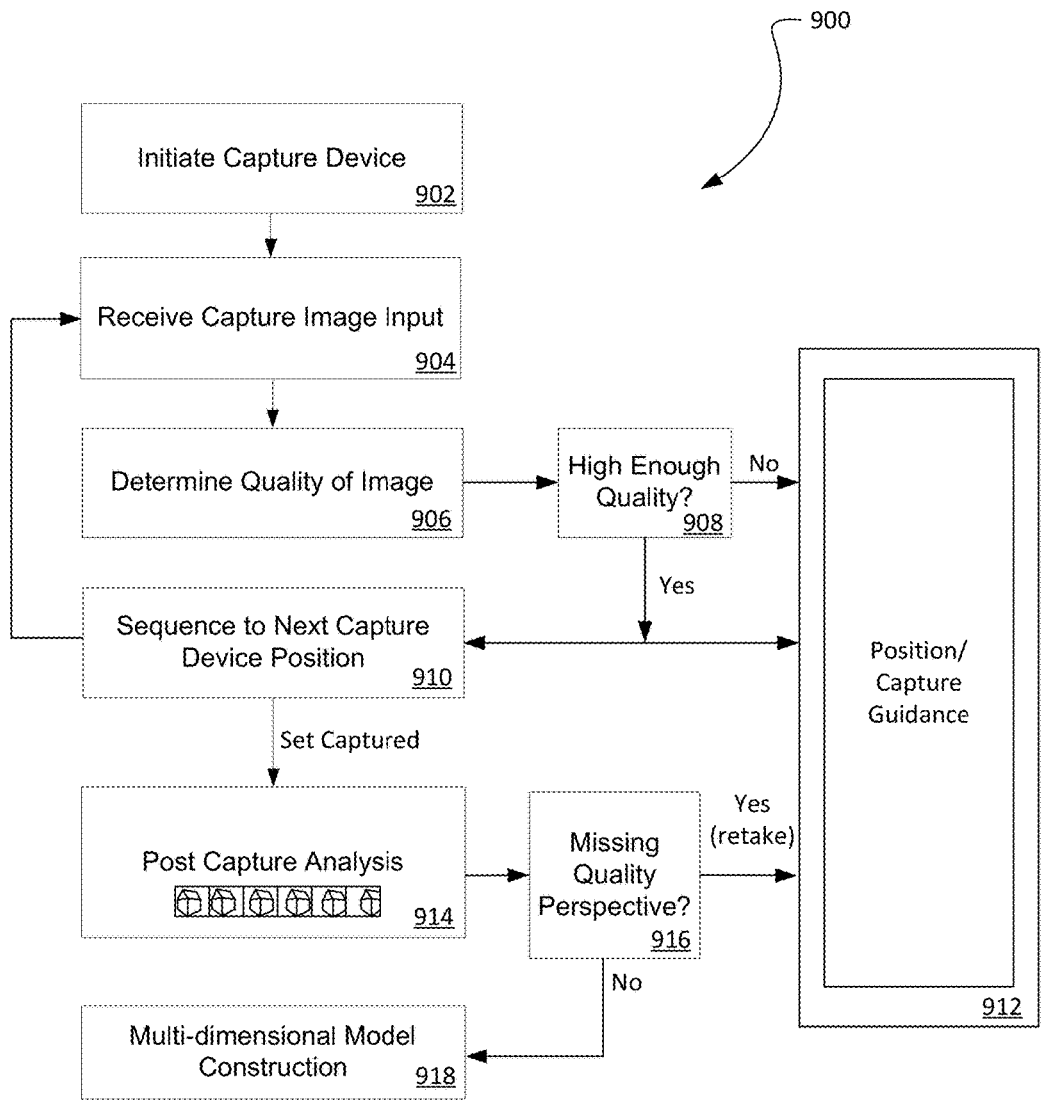
FIG. 9 illustrates a flow diagram of another embodiment for guiding a user to capture images used to create a multi-dimensional building model in accordance with the present disclosure.

FIG. 9 illustrates a flow diagram of another embodiment for guiding a user to capture images used to create a multi-dimensional (e.g., 3D) building model in accordance with the present disclosure. Process 900 begins in step 902 with initiation of a capture device 108 (e.g., smartphone with camera). Initiation may include one or more of: opening of an app (application) to initiate building capture, determining location and/or aspect (i.e., perspective), determining user information (name, login, account info, etc.), and/or determining if the subject of the ground level image is a residential or commercial building (manually from user selection or automatically from address, location determination and/or perspective). For example, the user's location can be determined from an address, known coordinates (latitude/longitude) or GPS. Alternately, using sensors of the capture device (e.g., pitch, yaw and roll axis), a determination can be made as to which surrounding building is the subject of the capture (i.e., facing a specific building on the south side of the street at a specific location). Other known equivalent methods can be substituted without departing from the scope of the technology disclosed herein. In one embodiment, the location step is skipped and the 3D building model results returned to the user without consideration of location.

In step, 904, an image (e.g., front of building or perspective with one corner and two sides) is received by the capture device, wherein capture includes manual capture by the user of the capture device or automatic capture by the capture device or a local or remote associated app. The image capture includes, for example, capture of one or more architectural features, facades, or one or more images based on various angles and/or distances (perspectives) relative to the building. In one embodiment, the image is stored locally in memory where it will be uploaded to be received by images data base 104 for multi-dimensional model construction by processing system 102. In one embodiment, the images are sent immediately upon being captured. In another embodiment, the images are collected together, as detailed below, until the process of capturing the building is completed and then the images are uploaded.

In step 906, a determination is made of relative picture quality (discussed in detail in association with FIGS. 3-11). The determination can, in one embodiment, include at least a determination of applicability in capturing one or more known architectural, dimensional, or planar elements of the building. The process for determining picture quality can, in one embodiment, be continuously repeated in near real-time (e.g., 5-10 frames per second (FPS) or faster). Picture quality can include an analysis of many variables such as, but not limited to, usability for multi-dimensional model building (e.g., a front corner image showing two facades coming together), percentage of building façade pixels within a frame of the viewfinder, distance of building façade pixels from centroid of picture (is building centered), number of times a sky within the image touches the ground (touching on both sides of building may suggest centered image), number of sky pixels touching top of building, lighting factors, such as brightness, dimness, glare, shading, as well as percentage of a building pixels obscured by other objects (bushes, trees, vehicles, people, etc.).

These quality components can, in one embodiment, be determined from a machine learning algorithm (e.g., various image features are extracted with a rating given to a specific feature and compared overtime to learn which features and their associated quality are effective in determining a quality image). This process includes continuously improving the quality determination with analysis of a greater number of data features and/or data sets.

If it is determined 908 that a high enough quality image is not detected (e.g., low usability to construct potential multi-dimensional building models), position/capture device guidance 912 may suggest corrective steps (position guidance) to the user capturing the image (e.g., move to a better angle, better position, move the camera, better lighting needed, etc.) to sequence to a next capture device position 910. The indication of acceptable quality can, in various embodiments, be a visual indicator (e.g., red color graphic, green color graphic, flashing image, etc.), audible indicator, or a combination thereof.

Once a quality threshold (minimum quality level as set by processing system 102, machine learning algorithm, training set, or user of system) is determined (high enough quality image 908), the position/capture guidance sequences to a next capture device position 910 for additional image captures until a set of building images is captured (e.g., all sides/corners of a building). The capture guidance process may be sequential (e.g., moving the capture device counter-clockwise around the building) or discrete (one specific image perspective) guiding 912 the user/camera to a specific position to take another image of the building. The process continues until the building is captured (e.g., four sides/corners). While, only one corner image of the building is required to minimally capture the building, the quality and accuracy of a 3D model of the building created from the images will improve with a greater number and better circumferential distribution (e.g., all sides and corners).

In step 914, a post capture analysis is performed on the set of images captured for the building. The post capture analysis is performed to determine if a quality perspective or architectural feature is missing from the set (e.g., garage, window, door, roof element). If it is determined that a quality perspective or architectural feature is missing from the set 916, the position/capture guidance 912 will direct the user/capture device to position the capture device to create (retake) an image with this missing perspective or feature.

If it is determined that a quality perspective or architectural feature is not missing from the set 916, in step 918, the captured images are used by image processing servers 102 to generate a multi-dimensional (e.g., 3D) model. The technology described herein is not limited by the method to produce the 3D building model. In one example embodiment, the images are uploaded to images DB 104 or to another computer/server memory for storage before processing in 102. In one example embodiment, the images are uploaded from third party image services (e.g., Flickr, Facebook, Twitter, etc.) first before being uploaded to image processing servers 102/images DB 104. For another example, the images are transferred first from a camera to a networked computer (e.g., cloud based server system), and then to image processing servers 102/images DB 104. The set of captured images are uploaded to an image processing system to generate a 3D building model that may, in one embodiment, be returned to the user. The returned 3D building model may incorporate scaled measurements of building architectural elements and may include a dataset of measurements for one or more architectural elements such as siding (e.g., aluminum, vinyl, wood, brick and/or paint), windows, doors or roofing. Also, the 3D building model may be created and/or displayed (partially or wholly) in real-time as the images are being captured.

Figure 10:
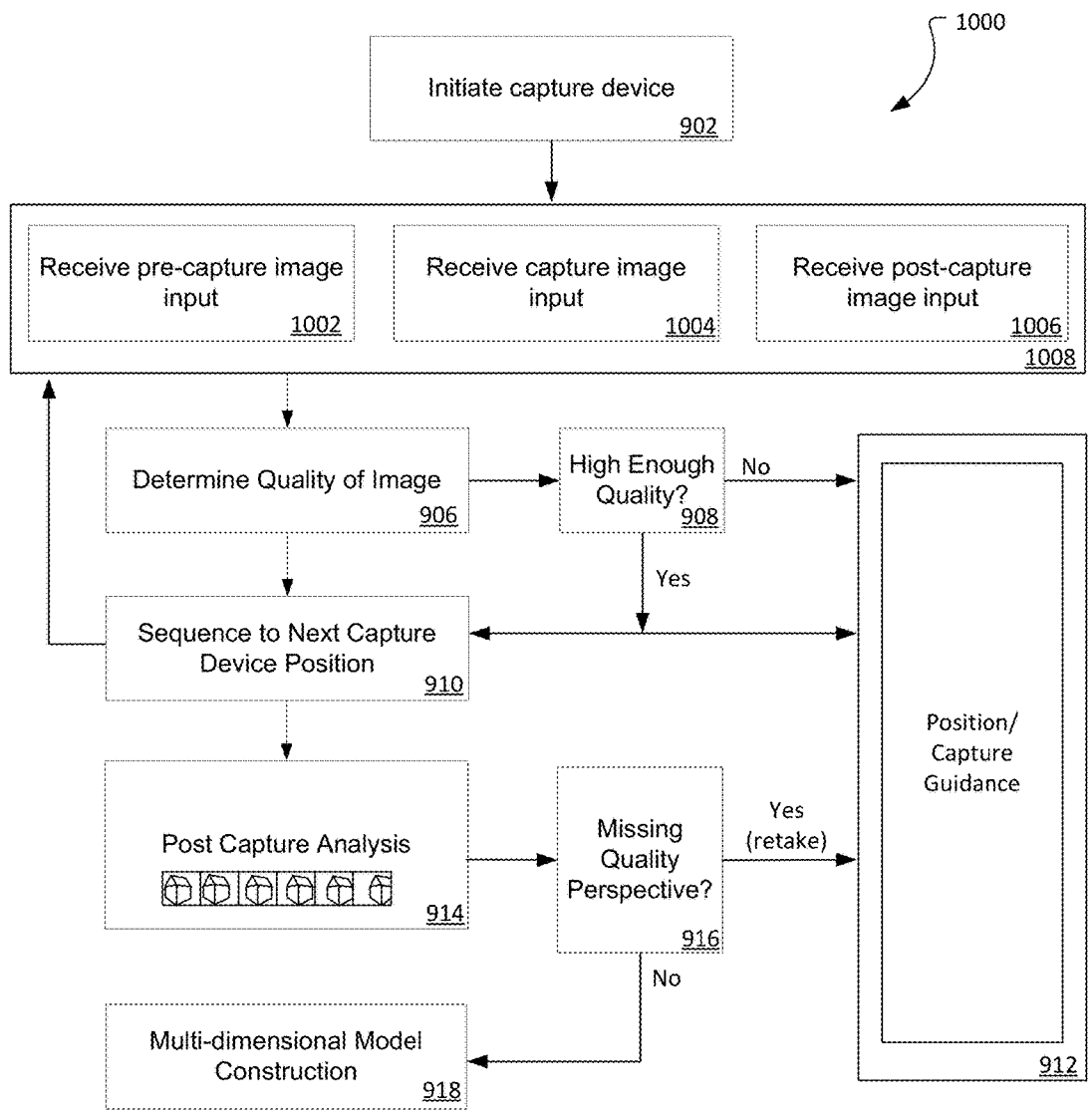
FIG. 10 illustrates a flow diagram of another embodiment for guiding a user to capture images used to create a multi-dimensional building model in accordance with the present disclosure.

FIG. 10 illustrates a flow diagram of another embodiment for guiding a user to capture images used to create a multi-dimensional (e.g., 3D) building model in accordance with the present disclosure. Process 1000 begins in step 902 with initiation of a capture device 108 (e.g., smartphone with camera). Initiation may include one or more of: opening of an app (application) to initiate building capture, determining location and/or aspect (i.e., perspective), determining user information (name, login, account info, etc.), and/or determining if the subject of the ground level image is a residential or commercial building (manually from user selection or automatically from address, location determination and/or perspective). For example, the user's location can be determined from an address, known coordinates (latitude/longitude) or GPS. Alternately, using sensors of the capture device (e.g., pitch, yaw and roll axis), a determination can be made as to which surrounding building is the subject of the capture (i.e., facing a specific building on the south side of the street at a specific location). Other known equivalent methods can be substituted without departing from the scope of the technology disclosed herein. In one embodiment, the location step is skipped and the 3D building model results returned to the user without consideration of location.

In steps 1002, 1004 and 1006 (collectively 1008), image inputs are received pre-capture, during capture and post-capture. For example, as a shutter is pressed/activated, but before full capture mode, the capture device (e.g., camera) may record a plurality of frames (images) during this pressing function (1002). These frames can be analyzed to determine, for example, subject framing (e.g., by placing a framing box around potential subjects of interest, etc.), focus adjustments, lighting, location, camera sensor readings, etc. However, in this embodiment, these images can also be used (if of high enough quality) in future preparation of multi-dimensional models.

Step 1004 represents image inputs that are received during capture. For example, while a shutter is pressed/activated, the camera device may record a plurality of frames (images) during this pressing function (1002). These images can be used (if of high enough quality) in future preparation of multi-dimensional models.

Step 1006 represents image inputs that are received post-capture. For example, as a shutter (or capture device equivalent) is being released from a pressed/activated state, but before achieving full release/deactivation, the camera device may record a plurality of frames (images) during this releasing/deactivating function (1006). These frames can also be used (if of high enough quality) in future preparation of multi-dimensional models.

In step 906, a determination is made of relative picture quality (discussed in detail in association with FIGS. 3-11). The determination can, in one embodiment, include at least a determination of applicability in capturing one or more known architectural, dimensional, or planar elements of the building. The process for determining picture quality can, in one embodiment, be continuously repeated in near real-time (e.g., 5-10 frames per second (FPS) or faster). Picture quality can include an analysis of many variables such as, but not limited to, usability for multi-dimensional model building (e.g., a front corner image showing two facades coming together), percentage of building façade pixels within a frame of the viewfinder, distance of building façade pixels from centroid of picture (is building centered), number of times a sky within the image touches the ground (touching on both sides of building may suggest centered image), number of sky pixels touching top of building, lighting factors, such as brightness, dimness, glare, shading, as well as percentage of a building pixels obscured by other objects (bushes, trees, vehicles, people, etc.).

These quality components can, in one embodiment, be determined from a machine learning algorithm (e.g., various image features are extracted with a rating given to a specific feature and compared overtime to learn which features and their associated quality are effective in determining a quality image). This process includes continuously improving the quality determination with analysis of a greater number of data features and/or data sets.

If it is determined 908 that a high enough quality image is not detected (e.g., low usability to construct potential multi-dimensional building models), position/capture device guidance 912 may suggest corrective steps (position guidance) to the user/capture device capturing the image (e.g., move to a better angle, better position, move the camera, better lighting needed, etc.) to sequence to a next capture device position 910. The indication of acceptable quality can, in various embodiments, be a visual indicator (e.g., red color graphic, green color graphic, flashing image, etc.), audible indicator, or a combination thereof.

Once a quality threshold (minimum quality level image as set by processing system 102, machine learning algorithm, training set, or user of system) is determined (high enough quality 908), the position/capture guidance sequences to a next capture device position 910 for additional image captures until a set of building images is captured (e.g., all sides/corners of a building). The capture guidance process may be sequential (e.g., moving the capture device counterclockwise around the building) or discrete (one specific image perspective) guiding 912 the user/camera to a specific position to take another image of the building. The process continues until the building is captured (e.g., four sides/corners). While, only one corner image of the building is required to minimally capture the building, the quality and accuracy of a 3D model of the building created from the images will improve with a greater number and better circumferential distribution (e.g., all sides and corners).

In step 914, a post capture analysis is performed on the set of images captured for the building. The post capture analysis is performed to determine if a quality perspective or desired architectural feature (e.g., garage, window, door, roof element) is missing from the set. If it is determined that a quality perspective or architectural feature is missing from the set 916, the position/capture guidance 912 will direct the user of the capture device to position the capture device to create (retake) an image with at least this missing perspective or feature.

If it is determined that a quality perspective or architectural feature is not missing from the set 916, in step 918, the captured images are used by image processing servers 102 to generate a multi-dimensional (e.g., 3D) model. The technology described herein is not limited by the method to produce the 3D building model. In one example embodiment, the images are uploaded to images DB 104 or to another computer/server memory for storage before processing in 102. In one example embodiment, the images are uploaded from third party image services (e.g., Flickr, Facebook, Twitter, etc.) first before being uploaded to image processing servers 102/images DB 104. For another example, the images are transferred first from a camera to a networked computer (e.g., cloud based server system), and then to image processing servers 102/images DB 104. The set of captured images are uploaded to an image processing system to generate a 3D building model that may, in one embodiment, be returned to the user. The returned 3D building model may incorporate scaled measurements of building architectural elements and may include a dataset of measurements for one or more architectural elements such as siding (e.g., aluminum, vinyl, wood, brick and/or paint), windows, doors or roofing. Also, the 3D building model may be created and/or displayed (partially or wholly) in real-time as the images are being captured.

Figure 11:
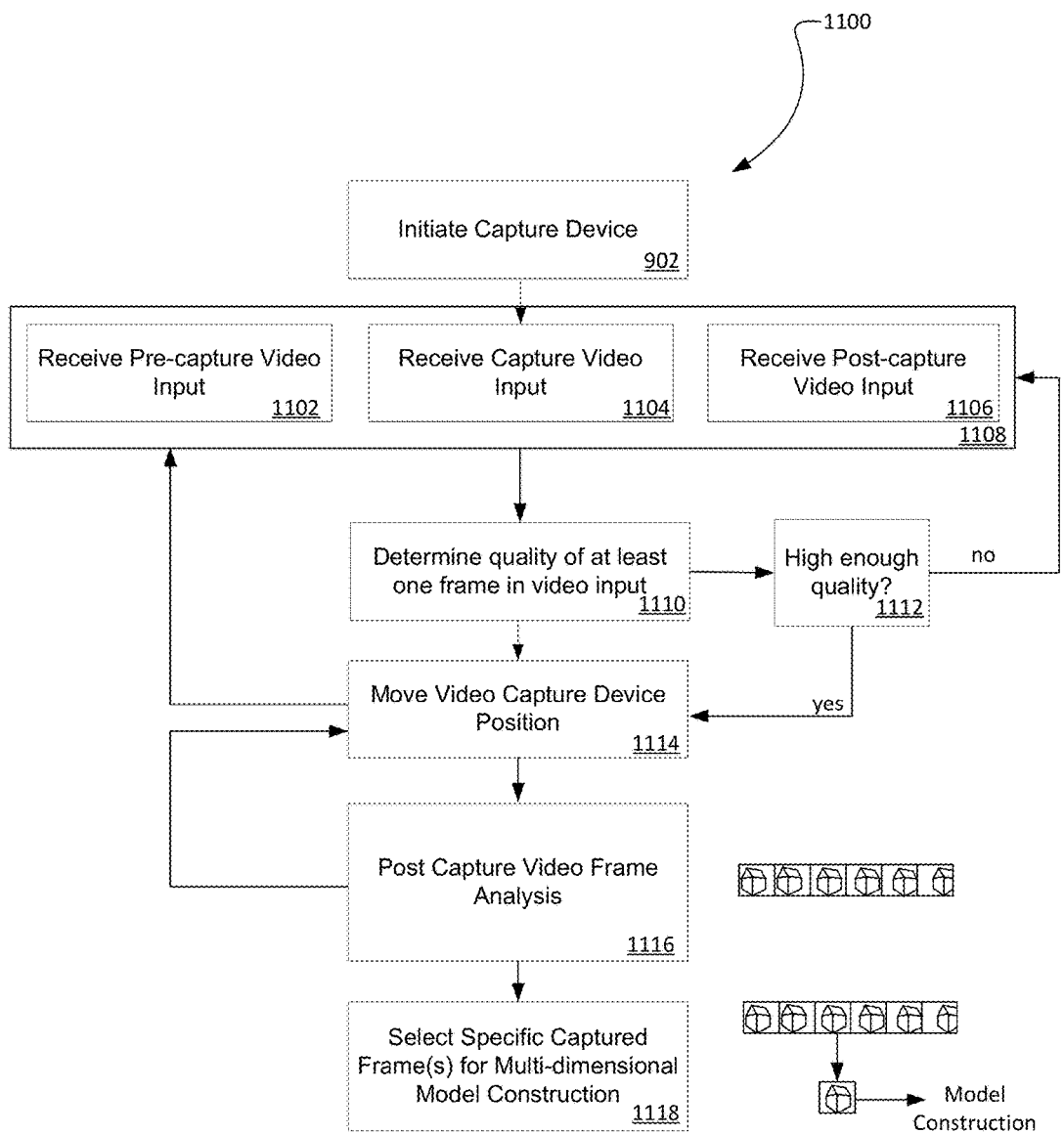
FIG. 11 illustrates a flow diagram representing a process for guiding a user to capture video images used to create a multi-dimensional building model in accordance with the present disclosure.

FIG. 11 illustrates a flow diagram 1100 representing a process for guiding a user to capture video images used to create a multi-dimensional (e.g., 3D) building model in accordance with the present disclosure. In steps 1102, 1104 and 1106 (collectively 1108), video image inputs are received pre-capture, during capture and post-capture. For example, as a shutter (or video capture device equivalent) is pressed/activated, but before full capture mode, the video camera device may record a plurality of frames (images) during this pressing function (1102). These frames can be analyzed to determine, for example, subject framing (e.g., by placing a framing box around potential subjects of interest, etc.), focus adjustments, lighting, location, camera sensor readings, etc. However, in this embodiment, these images can be used (if of high enough quality) in future preparation of multi-dimensional models.

Step 1104 represents video image inputs that are received during capture. For example, while a shutter is pressed/activated, the video camera device may record a plurality of frames (images) during this pressing function (1102). These images can be used (if of high enough quality) in future preparation of multi-dimensional models.

Step 1106 represents video image inputs that are received post-capture. For example, as a shutter is being released from a pressed/activated state, but before achieving full release/deactivation, the video camera device may record a plurality of frames (images) during this releasing/deactivating function (1106). These frames can be can also be used (if of high enough quality) in future preparation of multi-dimensional models.

In step 1110, a determination is made of relative video picture quality (discussed in detail in association with FIGS. 3-10). The determination can, in one embodiment, include at least a determination of applicability in capturing one or more known architectural, dimensional, or planar elements of the building. The process for determining picture quality can, in one embodiment, be continuously repeated in near real-time (e.g., 5-10 frames per second (FPS) or faster). Picture quality can include an analysis of many variables such as, but not limited to, usability for multi-dimensional building (e.g., a front corner image showing two facades coming together), percentage of building façade pixels within a frame of the viewfinder, distance of building façade pixels from centroid of picture (is building centered), number of times a sky within the image touches the ground (touching on both sides of building may suggest centered image), number of sky pixels touching top of building, lighting factors, such as brightness, dimness, glare, shading, as well as percentage of a building pixels obscured by other objects (bushes, trees, vehicles, people, etc.).

These quality components can, in one embodiment, be determined from a machine learning algorithm (e.g., various image features are extracted with a rating given to a specific feature and compared overtime to learn which features and their associated quality are effective in determining a quality image). This process includes continuously improving the quality determination with analysis of a greater number of data features and/or data sets. In step, 1108, a sequence of video frames (images) is captured, either manually by the user or automatically taken by the capture device or as instructed by the app. The video image capture is, for example, for one or more architectural features, or one or more angles of the capture device relative to the building, or one or more distances of the capture device relative to the building.

If it is determined that high enough quality frames are not captured (e.g., low usability to construct potential multi-dimensional building models), the process returns to video capture 1114. The indication of acceptable quality can, in various embodiments, be a visual indicator (e.g., red color graphic, green color graphic, flashing image, etc.), audible indicator, or a combination thereof. In one embodiment, the sequence of video images is stored locally in memory where it will be uploaded to be received by images data base 104 for multi-dimensional model construction by processing system 102. In one embodiment, the video images are sent immediately upon being captured. In another embodiment, the images are collected together, as detailed below, until the process of capturing the building is completed and then the images are uploaded. In one embodiment, the quality of images within the sequence of video frames is analyzed later for quality and step 1110 is skipped during video capture. In other words, continuous video frames are captured and later, specific frames that are determined to be of high enough quality are usable in constructing a multi-dimensional building model (step 1118).

In step 1114, the process is sequentially advanced (e.g., moving video camera counter-clockwise around the building) guiding the user/capture device to additional positions to continue to take video images of the building (the video can be captured continuously or discretely (ON/OFF)). This process continues until the entire building is captured (e.g., four sides/corners). While, only one corner image of the building is required to minimally capture the building, the quality and accuracy of a 3D model of the building created from the video images will improve with a greater number and better circumferential distribution (e.g., all sides and corners).

In step 1116, a post video capture analysis is performed on the video captured for the building. The post video capture analysis is performed to determine if a quality perspective or desired architectural feature (e.g., garage, window, door, roof element) is missing from the video captured. If it is determined that a quality perspective or architectural feature is missing from the video captured, the video capture device position step 1114 will direct the user/video capture device to position the video capture device to create (retake) video with at least this missing perspective or feature.

If it is determined that a quality perspective or architectural feature is not missing from the video, in step 1118, the captured video is used by image processing servers 102 to generate a multi-dimensional (e.g., 3D) model. In this step, specific frames from the captured video are selected (e.g., based on content, perspective, quality or architectural feature) and used in the construction of the multi-dimensional model.

The technology described herein is not limited by the method to produce the 3D building model. In one example embodiment, the video is uploaded to images DB 104 or to another computer/server memory for storage before processing in 102. In one example embodiment, the video is uploaded from third party image services (e.g., Flickr, Facebook, Twitter, etc.) first before being uploaded to image processing servers 102/images DB 104. For another example, the video is transferred first from a video camera to a networked computer (e.g., cloud based server system), and then to image processing servers 102/images DB 104. The video is uploaded to an image processing system to generate a 3D building model that may, in one embodiment, be returned to the user. The returned 3D building model may incorporate scaled measurements of building architectural elements and may include a dataset of measurements for one or more architectural elements such as siding (e.g., aluminum, vinyl, wood, brick and/or paint), windows, doors or roofing. Also, the 3D building model may be created and/or displayed (partially or wholly) in real-time as the images are being captured.

While the various embodiments are described with terminology such as "building", other visible structures or parts of visible structures are considered within the scope of the technology disclosed herein.

Throughout the specification, a machine or processing system may include a computer system within which a set of instructions, for causing the machine to perform any one or more of the methodologies or modules discussed herein, may be executed. Computer system includes a processor, memory, non-volatile memory, and an interface device. Various common components (e.g., cache memory) are omitted for illustrative simplicity. The computer system is intended to describe a hardware device on which any of the components depicted in the example of FIG. 1 (and any other components described in this specification) can be implemented. The computer system can be of any applicable known or convenient type. The components of the computer system can be coupled together via a bus or through some other known or convenient device.

This disclosure contemplates the computer system taking any suitable physical form. As example and not by way of limitation, computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system may include one or more computer systems; be unitary or distributed; span multiple locations; span multiple machines; or reside in a cloud, which may include one or more cloud components in one or more networks. Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted reside in the interface.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the technology as described herein have been expressly described herein, other combinations of these features and functions are likewise possible. For example, the steps may be completed in varied sequences to complete textured facades. The technology as described herein is not limited by the particular examples disclosed herein and expressly incorporates these other combinations.

What is claimed is:

1. A method of directed capture of building imagery, the method comprises:
   capturing, from a capture device, selected building imagery;
   receiving, by the capture device, an assessment of quality of a building image associated with the selected building imagery, the assessment of quality including at least a determination of applicability in capturing one or more known architectural, dimensional, or planar elements of the building, wherein the applicability includes image usability for constructing a multi-dimensional building model;
   receiving, by the capture device, based on the assessment of quality, feedback reflective of a positioning of the image capture device;
   when the feedback reflects a different image capture positioning, receiving, by the capture device, one or more instructions to modify the positioning of the image capture device;
   when the feedback reflects an acceptable image capture positioning, capturing one or more images of a set of the building imagery;
   saving to computer memory, of the capture device, the one or more images of a set of building imagery captured; and
   communicating the one or more images of the set of building imagery captured to a remote processing system for construction of a multi-dimensional building model based at least in-part on the communicated one or more images of a set of building imagery captured.

2. The method of claim 1 further comprising a post capture analysis of the set of building imagery captured to determine if specific perspective images or architectural features are missing from the set.

3. The method of claim 2 further comprising, if it is determined that specific perspective images or architectural features are missing from the set, receiving instruction to modify the positioning of the image capture device to capture the specific perspective images or architectural features missing from the set.

4. The method of claim 1, wherein the selected building imagery is derived from video capture by the image capture device.

5. The method of claim 1, wherein the selected building imagery is derived from either pre-capture or post-capture images provided to the image capture device.

6. The method of claim 5, wherein the pre-capture or post-capture images are provided to the image capture device in response to an image capture device camera shutter input.

7. The method of claim 1, wherein the planar elements include at least a portion of any of: facades, roof level imagery or an entire building object.

8. The method of claim 1, wherein the dimensional elements include at least a calculated dimensional ratio of the one or more known architectural elements.

9. The method of claim 1, wherein the image capture device is a local or remotely connected camera.

10. The method of claim 1, wherein the image capture device is any of: a camera, a phone, a smartphone, a tablet, a video camera, a security camera, a closed-circuit television camera, a computer, a laptop, a webcam, a wearable camera device, a photosensitive sensor, an IR sensor, a laser, a remote-controlled camera, or a drone.

11. The method of claim 1, wherein the assessment of quality of the building image is provided to the image capture device by any of: a visual indication on the image capture device, a visual indication on an associated communication device, or audible instructions.

12. A method of directed capture of building imagery, the method comprises:
    capturing, by a capture device, selected building imagery including one or more of: a pre-capture input or a post-capture input;
    receiving, by the capture device, an assessment of quality of a building image associated with the selected building imagery, the assessment of quality including at least a determination of applicability in capturing one or more known architectural, dimensional, or planar elements of the building, wherein applicability includes images usability for constructing a multi-dimensional building model;

receiving, by the capture device, based on the assessment of quality, feedback reflective of a positioning of the image capture device;

when the feedback reflects a different image capture positioning, receiving, by the capture device, one or more instructions to modify the positioning of the image capture device;

when the feedback reflects an acceptable image capture positioning, capturing one or more images of a set of the building imagery; and saving to computer memory, of the capture device, the one or more images of a set of building imagery captured; and communicating the one or more images of the set of building imagery captured to a remote processing system for construction of a multi-dimensional building model based at least in-part on the communicated one or more images of a set of building imagery captured.

13. The method of claim 12 wherein the post-capture input and the assessment of quality further includes at least a determination of applicability in capturing one or more known architectural, dimensional, or planar elements of the building image using at least the post-capture input.

14. The method of claim 12, wherein the pre-capture input or post-capture input is provided to the image capture device in response to an image capture device camera shutter input.

15. The method of claim 12, wherein the selected building imagery is derived from video capture by the image capture device.

16. The method of claim 12 further comprising a post capture analysis of the set of building imagery captured to determine if specific perspective images or architectural features are missing from the set.

17. The method of claim 12 further comprising, if it is determined that specific perspective images or architectural features are missing from the set, receiving instruction to modify the positioning of the image capture device to capture the specific perspective images or architectural features missing from the set.

18. A method of capture of building imagery, the method comprising:

receiving, from a video image capture device, video imagery of a selected building;

receiving an assessment of quality of a plurality of building images each associated with individual frames within the video imagery, the assessment of quality including at least a determination of applicability in capturing one or more known architectural, dimensional, or planar elements of the building, wherein applicability includes usability for constructing a multi-dimensional building model;

receiving, based on the assessment of quality of the individual frames, selection of specific frames within the plurality of building images; and constructing a multi-dimensional building model from a plurality of the specific frames.

* * * * *